Jan. 8, 1952 — A. K. NOWAK — 2,581,435
PRESS WITH MECHANICAL DRIVE HAVING HARMONIC MOTION AND HYDRAULIC TRANSMISSION
Filed March 31, 1948 — 6 Sheets-Sheet 1

Fig-1

INVENTOR.
Alois Karl Nowak
BY Mann and Brown
Attys.

END OF GRAVITY DROP        END OF DRAW STROKE

DWELL        STRIP

UNITED STATES PATENT OFFICE 2,581,435

PRESS WITH MECHANICAL DRIVE HAVING HARMONIC MOTION AND HYDRAULIC TRANSMISSION

Alois Karl Nowak, Evanston, Ill.

Application March 31, 1948, Serial No. 18,110

14 Claims. (Cl. 60—54.5)

This invention relates to power presses, and has for its principal objects:

To make a fixed stroke drive such as an eccentric deliver the necessary power to a tool carrying slide having a longer stroke than the eccentric;

To make it practicable to use an eccentric or the like with a stroke approximately the same as the maximum depth of the draw part while providing the necessary or appropriate daylight;

To reduce the draw speeds and increase the draw time and make it possible to use common drawing steel sheets while maintaining the present production speeds which now require special steels to prevent rupture;

To increase the number of stroke cycles per minute, and hence the output of the press;

To provide a pressure stroke which, upon contact of the tool with the work piece, starts at zero velocity, gradually increasing into maximum velocity, thereby coaxing the material gradually into full plastic flow;

To eliminate impact between tool and work piece;

To provide pressure adjustment at the end of the working stroke of the eccentric or the like drive to a predetermined, gauge indicated amount;

To protect the eccentric or the like drive against overloading; and

To use eccentric or the like drive and produce a pressure dwell at the end of the down stroke.

Generally speaking, this and other objects and advantages are accomplished by apparatus including a hydraulic transmission between a reciprocating drive and a tool carrying slide and controls whereby—

1. The slide my be permitted to drop through a quick approach suited to the die height or daylight while the corresponding space in the transmission is filled with fluid ready to transmit the power of the drive through a working stroke approximately equal to the length of the drive stroke;

And this with or without a dwell at the bottom of the stroke; and

2. During the down stroke another space in the transmission is filled with fluid ready to transmit the power of the drive through the return stroke equalling in length the combined lengths of the approach and working strokes.

These general characteristics with appropriate detail will appear as the description is read with the accompanying drawings, in which.

General description

The press includes a bed 10 adapted to receive a tool 11 (Figs. 3-6) to cooperate with a tool 12 carried by a slide 13 arranged to reciprocate in guides 14.

Figure 1:
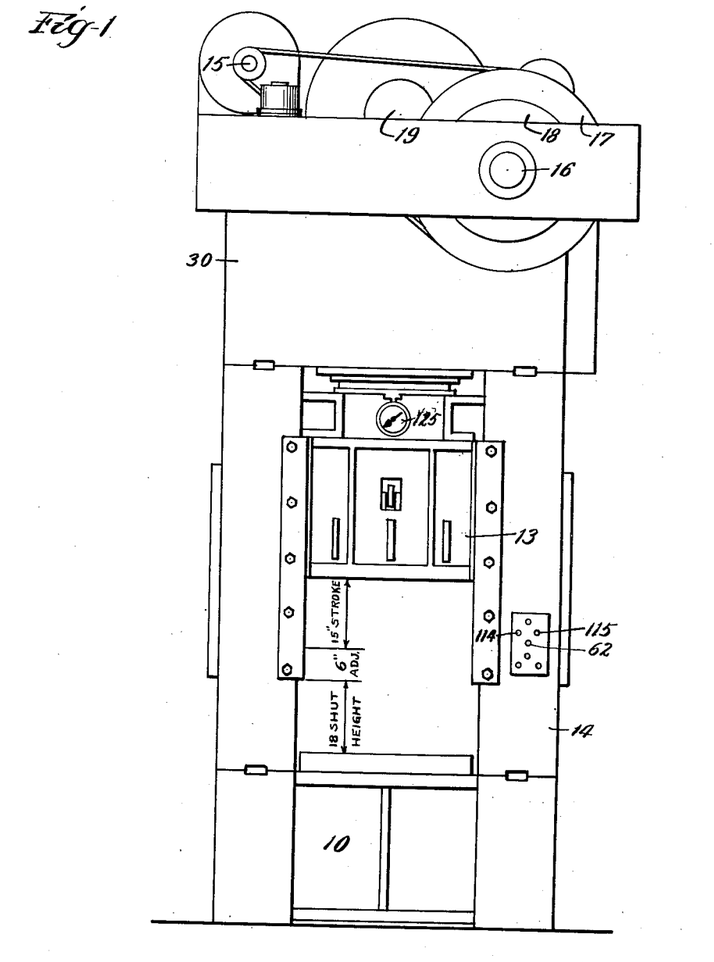
Fig. 1 is a diagrammatic front elevation of a press embodying this invention.

A motor 15 (Fig. 1) drives a countershaft 16 having a flywheel 17 and an air clutch 18 and driving a main shaft 19 through gearing 20 (Figs. 2-6). The main shaft is equipped with an eccentric 21 cooperating with an eccentric strap 22 and a rod 23 to form the reciprocating drive for the press.

The hydraulic transmission

Figures 9, 10, 11:
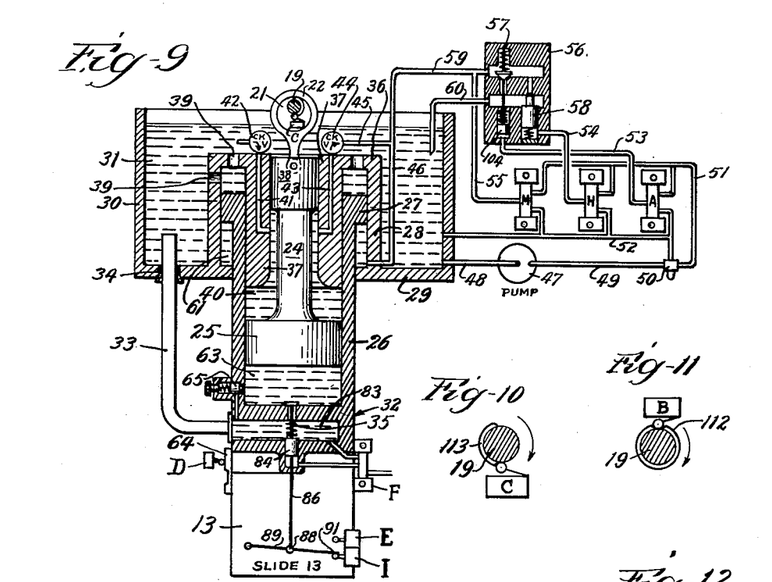
Fig. 9 is a diagrammatic representation of the hydraulic mechanism and the controls.
Fig. 10 is a diagrammatic representation of one of the switches, here shown as a control to be operated at the end of the down stroke.
Fig. 11 is a similar view of one of the switches here shown as a control to end a cycle.

The general characteristics of the hydraulic transmission and associated mechanism are shown in the simplified diagram (Fig. 9). It includes a ram or plunger, generally indicated by 24, driven by the eccentric 21 through the strap 22 and the rod 23, and hence has a reciprocating movement.

The lower end of the ram has a main piston 25 in a main cylinder 26 connected to the slide 13 to move with it.

The main cylinder 26 also functions as a piston element having a piston 27 at its upper end in a cylinder 28, which is mounted upon the crown 29 of the press, which conveniently takes the form of a hydraulic tank 30 for hydraulic fluid 31.

The lower end of the cylinder 26 has a hollow head 32 connected by a gooseneck pipe 33 with the interior of the hydraulic tank 30 through a stuffing box 34.

A valve, generally indicated by 35, controls the flow of fluid to and from the cylinder 26 below the piston 25 from the hydraulic tank 30 through the gooseneck 33. For want of more satisfactory names, the valve 35 will be called a prefill valve or filling valve, although it also serves as an emptying valve on appropriate occasions.

The upper end of the cylinder 26 is closed by a head 36 carrying a depending sleeve 37, one side of which cooperates with the piston 27 on the cylinder 26 and the other side of which cooperates with a piston 38 on the upper end of the ram 24.

The space between the cylinder 26, the head 36, the sleeve 37, and the piston 27 is in direct and open communication with the liquid 31 in the tank 30 at all times through passages 39.

The chamber 40 between the pistons 25 and 38 and within the cylinder 26 and the sleeve 37 communicate through a passage 41 in the latter with the interior of the tank 30 under control of a check valve 42, which freely admits liquid as the ram descends but closes automatically as the ram ascends.

The same space is in communication with another passage 43 in the sleeve 37 controlled by another check valve 44, which opens freely as the ram ascends and closes as the ram descends.

The check valve 44 is connected by a pipe or passage 45 and a pipe or passage 46 with the interior of the cylinder 28 below the piston head 27 on the cylinder 26.

*The control mechanism*

Figure 7:
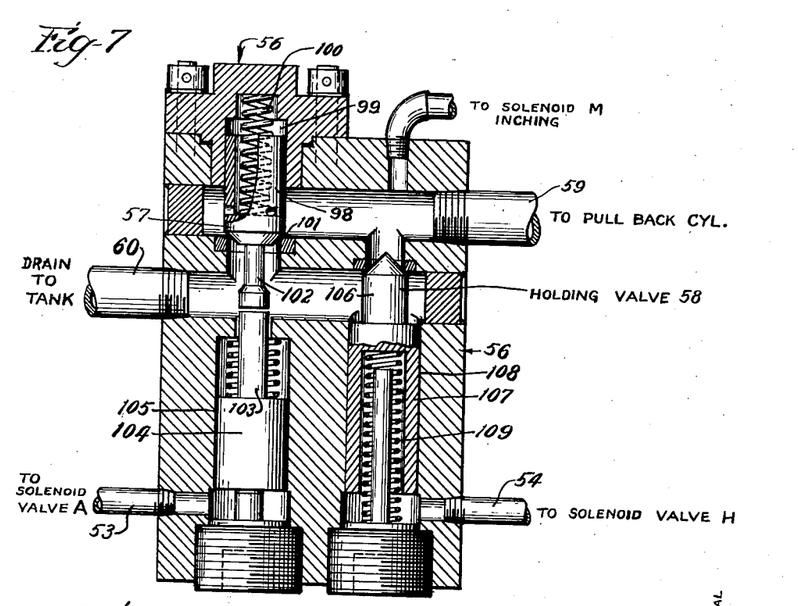
Fig. 7 is an enlarged section somewhat diagrammatic through control valve mechanism.

The control mechanism shown diagrammatically in Fig. 9 includes what will be called a pilot pump 47 having an inlet passage 48 connected with the tank 30 and a discharge 49 connected by a pressure limiting valve 50 with a control system which includes a main pressure line 51, a main discharge line 52, three solenoid operated valves A, H, and M connected as indicated with the pressure and release lines 51 and 52 and by other lines 53, 54, and 55 with a control valve mechanism generally indicated by 56 in Figs. 7 and 9 and including what will be called a pullback valve 57 and a holding valve 58, the lead 55 being connected by a pipe 59 with the passage 46.

Both the pull-back valve 57 and the holding valve 58 control the flow between the pipe 59 and the discharge pipe 60, and hence between the chamber 61 below the piston 27 in the cylinder 28 and the tank 30.

*General operation*

Assume the countershaft 19 to be driven, the air clutch 18 released, the pilot pump 47 to be in operation, and the hydraulic system properly filled. A cycle of operations may be started by pressing a cycle button 62 to operate the solenoid valve A and put control pressure into the line 53 to open the pull-back valve 57 and permit fluid in the chamber 61 beneath the piston 27 to flow out through the connections described into the tank 30. That will permit the cylinder 26 with the slide and appurtenances to drop through a quick approach, bringing the die 12 to about the position shown in Fig. 3, while the prefill valve 35, yielding to atmospheric pressure, permits hydraulic fluid to flow from the tank 30 through the gooseneck 33 into a chamber 63 within the cylinder 26 below the piston 25.

Figure 13:
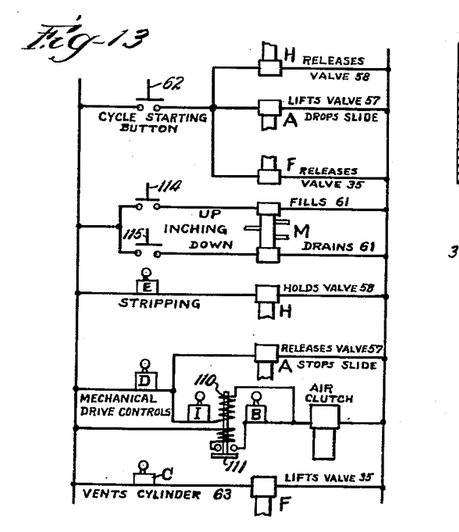
Fig. 13 is a wiring diagram.

An adjustable cam 64 on the side of the slide strikes a limit switch D (Figs. 3 and 9 and diagram Fig. 13), which will operate the solenoid valve A to release the opening pressure on the pullback valve 57 and permit it to close. That stops the free flow of supporting fluid from the chamber 61 below the piston 27, and hence the approach movement of the slide. The blow, however, is eased due to the fact that the holding valve 58 is spring loaded to support normally the weight of the cylinder 26, the slide and appurtenances, and hence acts as a relief valve to permit the blow to be absorbed by relieving the hydraulic column.

Closing the switch D by the cam 64 starts the eccentric rotating clockwise in Figs. 2, 3, 4, 5, 6, and 9.

Figure 4:
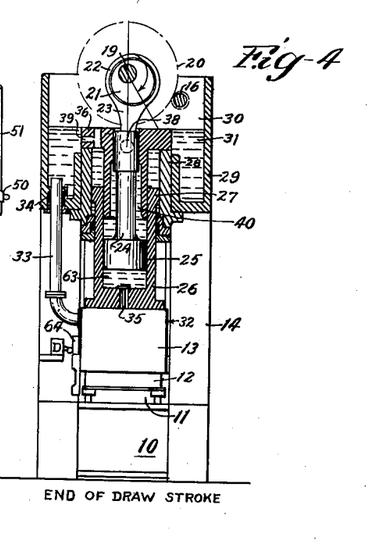
Fig. 4 is a similar representation of the parts at the end of the draw.
Figure 5:
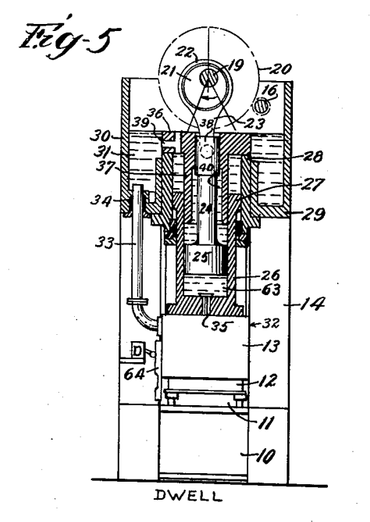
Fig. 5 is a similar representation of the parts during the dwell.
Figure 6:
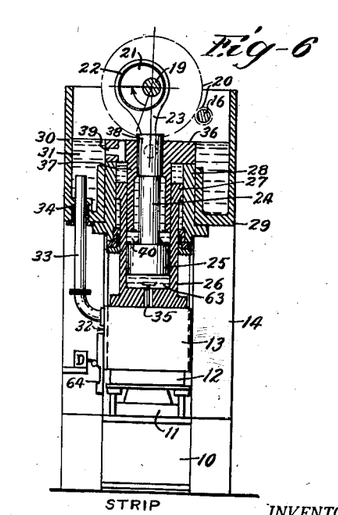
Fig. 6 is a similar representation of the parts during the stripping.

The space 63 below the piston 25 in the cylinder 26 having been filled with hydraulic fluid during the drop of the cylinder 26 and the slide, the movement of the ram 24 caused by the eccentric will be communicated directly to the slide and the tool 12, and the parts will pass to the position shown in Fig. 4 in the draw stroke.

If there is to be a dwell, the dies 11 and 12 will be completely closed before the eccentric reaches the bottom of the stroke, and a pressure relief valve 65 (Fig. 9) will permit fluid to flow from the chamber 63 through the gooseneck 33 back to the tank 30 during a period of dwell while the dies are firmly pressed together on the work.

During the descent of the piston 25, hydraulic fluid is forced by atmospheric pressure through the check valve 42 and the passage 41 and keeps the chamber 40 above the piston 25 filled. As the eccentric passes the bottom of the stroke and the piston 25 begins to rise, the fluid in the chamber 40 is forced out through the passage 43 in the sleeve 37, the check valve 44, the passages 45 and 46 into the chamber 61 below the piston 27 on the cylinder 26; and the relation between the areas of the upper side of the piston 25 and the lower side of the piston 27 (about 2:1) is such that there is strong pressure exerted below the piston 27 to raise the cylinder 26 rapidly as compared with the upward movement of the ram 24. Omitting some detail for the present, the prefill valve 35 will be opened, and the fill-in fluid that passed into the space 63 below the piston 25 during the quick drop of the cylinder 26 and the slide during the approach is forced out through the gooseneck 33 back into the tank 30 as the parts approach the position shown in Fig. 6.

At the proper point in the cycle, the solenoid valve H is operated to put the pilot pressure behind the holding valve 58 to maintain it closed to the end that the full pressure developed by the upward movement of the piston 25 may be utilized beneath the piston 27 to strip the die from the work.

As the eccentric reaches the top of the stroke, a cam 112 on the countershaft 19 (Fig. 11) operates the switch B to release the air clutch and let the cycle come to a close.

Figure 12:
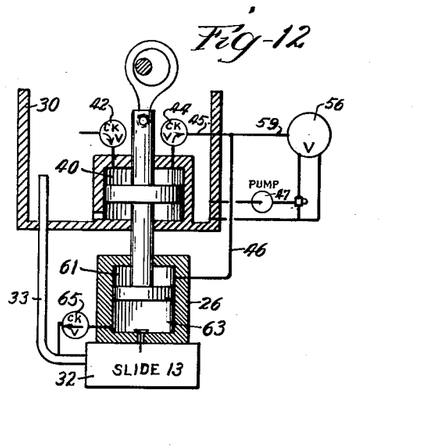
Fig. 12 is a diagram to illustrate the essential features of the hydraulic transmission between the reciprocating drive and the slide.

The simple essentials of the hydraulic system are shown diagrammatically in Fig. 12. Pressure in the chamber 61 supports or raises the cylinder 26 with the slide 13 and appurtenances. Venting that space through the pipes 46 and 59 and the control valve 56 permits the cylinder 26 and the slide to drop through the quick approach while the space 63 is kept constantly supplied with fill-in oil to the end that, when the eccentric is started, its downward movement is immediately communicated to the die, and the full stroke of the eccentric may be used for the draw. During the down stroke, fluid from the tank 30 enters through the check valve 42 and keeps the space 40 filled with fluid, and, upon the up stroke, that fluid is forced out through the check valve 44, and the pipes 45 and 46, into the chamber 61 to effect the stripping of the die and the upward movement of the cylinder 26.

Specific structure

Figure 2:
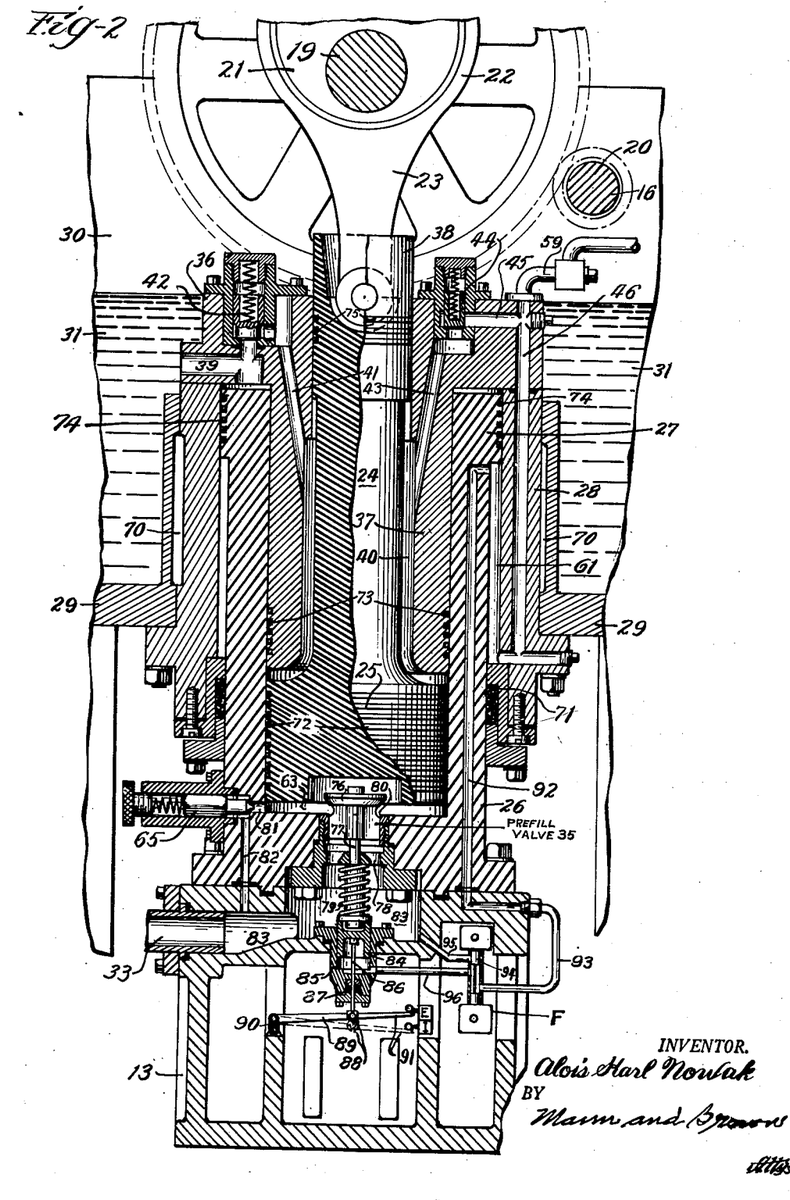
Fig. 2 is an enlarged vertical section emphasizing the hydraulic transmission between the reciprocating drive and the slide.

Fig. 2 shows a specific form embodying the invention in which it will be seen that the cylinder 28 and assembled parts are received within a flanged opening 70 in the crown 29 forming the bottom of the tank 30. A stuffing box 71 surrounds the cylinder 26 and effects a seal with the lower end of the cylinder 28. Piston rings 72, 73, 74, and 75 effect appropriate seals between the pistons and cylinders 25, 26, 37, 38, 27 and 28.

The prefill valve 35 includes a valve head 76 having a stem 77 guided in a valve casing 78 and urged by a spring 79 against a seat 80 at the bottom of the chamber 63 in the cylinder 26. The relief valve 65 controls a bore 81 leading from the chamber 63 to a bore 82 leading into a chamber 83 in open communication with the gooseneck pipe 33.

Beneath the stem 77 of the prefill valve and cooperating with it is a piston 84 in a cylinder 85 and having a rod 86 passing through a stuffing box 87 and pivoted at 88 to a switch lever 89 fulcrumed on a link 90 and having its free end 91 in operative relationship to the switches E and I.

The space 61 below the piston 27 for the pullback pressure is in communication with a passage 92 in the wall of the cylinder 26 connected by a pipe 93 with a cylinder 94 of a solenoid operated piston valve F connected by pipes 95 and 96 with the cylinder 84 and the space 83, which latter is in open communication with the gooseneck pipe 33, and therefore the tank 30.

The passages 41 and 43 in the sleeve 37 are inclined instead of angular, as shown in the diagram (Fig. 9), but they effect the same connection with the space 40 above the piston 25 within the cylinder 26 and the sleeve 37.

The control valve assembly including the pullback valve 57 and the holding valve 58 are as shown specifically in Fig. 7. The pullback valve includes a cylindrical valve head 98 in a cylinder 99 urged by a spring 100 against a seat 101, and having a stem 102 aligned for pushing by a rod 103 on a piston 104 in a cylinder 105 connected by the pipe 53 with the solenoid valve A (Fig. 9).

The holding valve includes a valve head 106 carried by a hollow piston 107 movable in a cylinder 108 connected by a pipe 54 with a solenoid valve H. The holding valve is preloaded by a spring 109 to support the weight of the cylinder 26, the slide 13, and associated parts.

Cycle Operation

Presses embodying this invention may be organized for continuous repetition operation, but this part of the description deals with cycle operation; that is, starting from an idle position of all the parts and making one complete cycle and stopping at the starting point.

At the start of any cycle, it may be assumed that a preceding cycle has just been completed, which carries the further assumptions that the eccentric 21 is at the top of the stroke, the air clutch 17 is open, the pilot or control pressure is holding the holding valve 58 closed against the pullback pressure generated by the upward movement of the main piston 25, and that the pullback pressure is beneath the piston 84 (Fig. 2), and is holding the prefill valve 35 open.

A cycle is started by pressing the cycle button 62 (Fig. 13), which closes the circuit, energizing the solenoid valves A, H, and F. The valve A puts control pressure beneath the piston 104 (Fig. 7) to open the pullback valve 57 (Figs. 7 and 9) and allow the hydraulic fluid in the chamber 61 below the piston 27 to flow out to the reservoir 30, and thus permit the cylinder 26, the slide 13 and assembled parts to drop.

The valve H exhausts the pressure beneath the holding valve 58, preparing it to relieve the shock of checking the slide at the end of the approach.

The valve F relieves the pressure beneath the piston 84 by connecting it with the chamber 83 and the gooseneck pipe 33 leading back to the reservoir 30, thereby permitting the spring 79 to close the filling valve 35.

Figure 3:
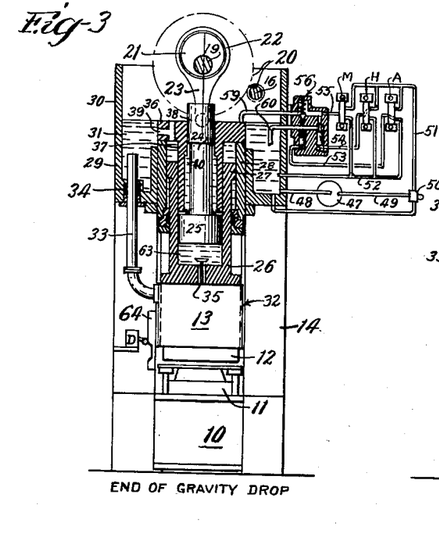
Fig. 3 is a diagrammatic representation of the parts at the end of the approach.

It follows that pressing the cycle button 62 initiates the drop through the quick approach, ending, as illustrated in Fig. 3, with the cam 64 closing the switch D.

From the diagram (Fig. 13), it will appear that closing the switch D operates the solenoid valve A to release the pilot or control pressure that has been holding the pullback valve 57 open and allow that valve to close, checking the flow from the chamber 61 beneath the piston 27 and checking the approach, but the shock is relieved by the holding valve 58, which acts as a pressure relief valve normally loaded to sustain properly the weight of the cylinder 26, slide 13, and assembled parts.

Closing the switch D (Fig. 13) also closes the circuit through the switch I (Fig. 2) on the slide by the lever 89, when the filling valve spring 79 forces the valve stem 86 down. This circuit includes a solenoid 110 (Fig. 13) for operating a switch 111 to close an auxiliary circuit through the switch B, which is operated by a cam 112 (Fig. 11) on the countershaft 19, which is thereby maintained in a closed circuit after the switch D has been opened by the return movement of the slide above the end of the approach, as shown in Fig. 3.

Closing the switch D (Fig. 13) by the approach movement of the slide, as indicated in Fig. 3, lets the air clutch 17 in and starts the countershaft 19 and eccentric 21 on a revolution.

The upper die being properly in contact with the work, the entire stroke of the eccentric, less the amount of any dwell, is exerted against the work, thereby increasing the draw time and reducing the draw speed as compared with the practice heretofore.

Assuming a dwell, the tools will come together on the work in advance of the bottom stroke of the eccentric, and therefore the slide, and will be held in that relation during the remainder of the stroke and a part of the decompression, the effective pressure being maintained as the relief valve 65 permits sufficient fluid to escape from the chamber 63 below the piston 25 to prevent damage to the press.

A cam 113 (Fig. 10) on the countershaft 19 operates the switch C at the bottom of the eccentric stroke, or such approximation of that as may be selected. Operating that switch C (Fig. 13) operates the solenoid valve F to put the cylinder 85 for the piston 84 one the slide in communication with the pullback pressure in the chamber 61 beneath the piston 27 on the movable cylinder 26.

Bearing in mind that the effective area of the upper side of the piston 25 is on the order of twice that of the lower side of the piston 27, it will be apparent that an early effect of the eccentric starting on the up stroke with the piston 25 is to develop high pressure in the chamber 61, which is communicated through the solenoid valve F on the slide to the cylinder 85, raising the piston 84 to about the position shown in Fig. 2 and operating the switch E, which closes a circuit (Fig. 13), energizing the solenoid valve H to put the control or pilot pressure beneath the piston 108 of the holding valve 58 and setting it against the escape of fluid through that valve to the tank 30, thereby preserving the pullback pressure in toto to power the stripping of the die on the work and effecting the quick up or return stroke of the slide and the cylinder 26.

As the decompression develops in the chamber 63, or, stated in another way, as the pressure in that chamber decreases, the pullback pressure communicated to the cylinder 85 below the piston 84 will overcome the pressure in the chamber 63 and open the prefill valve 35, thereby permitting the fill-in hydraulic fluid to flow back through the gooseneck 33 to the tank as the cylinder 26 rises during the stripping and return operations.

When the eccentric reaches the top of the stroke, the cam 112 (Fig. 11) allows the switch B to open, thereby opening the circuit that has been held closed by the solenoid switch 111 (Fig. 13) and releasing the air clutch 17, bringing the cycle to an end.

Figure 8:
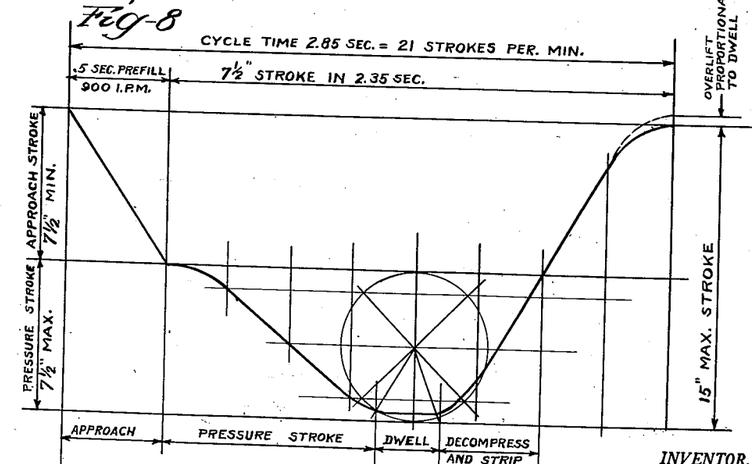
Fig. 8 is a chart of a stroke cycle of a press embodying this invention.

Fig. 8 shows by way of a chart the relative portions of a cycle including a quick approach, a long pressure or draw stroke, a dwell, a powerful strip, and quick return.

Adjustment of the press

The adjustment of the press for daylight is readily effected by increasing and decreasing the volume of fluid within the chamber 61 beneath the piston 27 on the movable cylinder 26. This is preferably accomplished somewhat after the fashion indicated in the diagram (Fig. 13), where the switches 114 and 115 are shown controlling circuits for operating the solenoid valve M, which is automatically held in neutral position until, by closing one of those circuits, it is shifted up or down to connect the pilot pressure of the pipe 51 (Fig. 9) through the pipes 55, 59, and 46 to the chamber 61, or to vent the chamber 61 back through those pipes and the valve M to the discharge 52 into the tank 30. Pressing the button 114, for instance, increases the fluid in the chamber 61 and raises the slide. Pressing the switch 115 reduces the fluid in the chamber 61 and depresses the slide. This adjustment and the adjustment of the cam 64 will determine the position of the slide at the closing of the switch D (Figs. 9 and 3), and the starting stroke of the reciprocating drive. Hence, those adjustments determine the amount, if any, of the dwell.

A gauge 125 (Fig. 1) subject to the pressure in the chamber 40 gives constant visual indication of the pressures applied to the tools and guides in appropriate adjustment of the relief valve 65 to confine the pressures to the desired limit.

An alternative form

Figure 14:
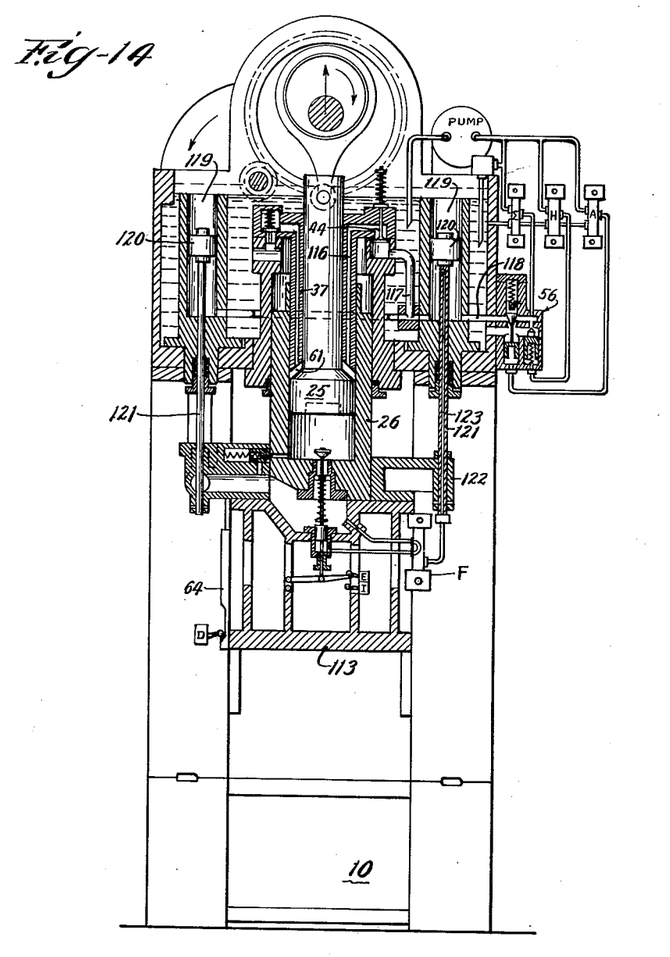
Fig. 14 is a diagrammatic vertical section through a modified form of press.

An alternative embodiment of the invention is shown in Fig. 14, which relates mainly to the pullback arrangement. A comparison between Fig. 14, on the one hand, and Figs. 2 and 9, on the other, will make it appear at once that the pullback piston 27 on the movable cylinder 26 has been omitted. The pullback pressure in the chamber 61 above the main piston 25 is led through passage 116 in the sleeve 37 and check valve 44 to a pipe 117 delivering to a header 118 in communication with the control valve 56 and a plurality of pullback cylinders 119 equipped with pistons 120 having piston rods 121 adjustably connected with a cross head 122 fast to the slide 13. One of the piston rods 121 has a passage 123 for conducting the pullback pressure to the solenoid valve F. Otherwise, the embodiment is very much the same as shown in the remaining figures, and the operation is substantially the same in all important respects.

It is a distinguishing characteristic of this invention that the slide may be permitted to drop through a quick approach while the hydraulic transmission is filled with fluid corresponding in amount to the drop, and made ready to transmit the power of the drive to the draw throughout substantially the entire down stroke of the reciprocating drive, thereby making an increase in the draw time and a decrease in the draw speed as compared with prior presses. This will also make it apparent that the disclosure in my prior application, Ser. No. 784,123, filed November 5, 1947, also embodies the instant invention, and the three embodiments thus illustrated will indicate sufficient variety to enable press designers to apply the invention to a variety of conditions.

I claim:

1. In a draw press, the combination of a slide, an intermittently operated mechanical drive for the slide including a device for applying variable pressure during the draw stroke, an extensible connection between the drive and the slide, means independent of said drive for extending said connection to move the slide from full open position through a substantial part of its approach stroke, means responsive to a predetermined extension of said connection for starting the mechanical drive, means for returning the slide to said full open position, a tank, a hydraulic transmission between the drive and the slide, valve means to supply fluid to the transmission from the tank during the approach stroke and to close communication between the tank and the transmission during the draw stroke, said slide, drive, and hydraulic transmission being so adjusted that said slide will come substantially to a dwell position prior to the time said drive will reach its most extended position, valve means to vent the transmission to the tank in response to a predetermined pressure in said transmission, which predetermined pressure is exceeded when said slide is in said dwell position, and force actuated valve means to vent said transmission during the return of said slide to said full open position.

2. In a draw press, the combination of a slide, an intermittently operated mechanical drive for the slide including a device for applying variable pressure during the draw stroke, an extensible connection between the drive and the slide, means independent of said drive for extending said connection to move the slide from full open position through a substantial part of its approach stroke, means responsive to a predetermined extension of said connection for starting the mechanical drive, a hydraulic transmission between the slide and the drive including a reciprocating ram, a hydraulic tank, valve means to supply fluid to said transmission from the tank during the approach stroke and to close communication between said tank and said transmission during the draw stroke, said slide, drive, and hydraulic transmission being so adjusted that said slide will come substantailly to a dwell position prior to the time said drive will reach its most extended position, valve means to vent the transmission to the tank in response to a predetermined pressure in said transmission, which predetermined pressure is exceeded when said slide is in said dwell position, and hydraulic pull-back means connected for communication with said transmission on one side of said ram, whereby said pull-back means moves said slide toward the full open position when the pressure on said one side of said ram is increased.

3. In a draw press, the combination of a slide, an intermittently operated mechanical drive for the slide including a device for applying variable pressure during the draw stroke, an extensible connection between the drive and the slide, means independent of said drive for extending said connection to move the slide from full open position through a substantial part of its approach stroke, means responsive to a predetermined extension of said connection for starting the mechanical drive, a hydraulic transmission between the slide and the drive including a reciprocating ram, a hydraulic tank, valve means to supply fluid to said transmission from the tank during the approach stroke and to close communication between said tank and said transmission during the draw stroke, said slide, drive, and hydraulic transmission being so adjusted that said slide will come substantailly to a dwell position prior to the time said drive will reach its most extended position, valve means to vent the transmission to the tank in response to a predetermined pressure in said transmission, which predetermined pressure is exceeded when said slide is in said dwell position, and hydraulic pull-back means operated by the return of the ram.

4. In a press, a slide, a mechanical drive for the slide having harmonic motion, a fixed cylinder, a reciprocating combined cylinder and piston, and a piston, said piston being connected to the mechanical drive and movable within said reciprocating combined cylinder and piston, and said combined cylinder and piston being secured to the slide and movable within said fixed cylinder, said fixed cylinder, combined cylinder and piston, and said piston constituting a hydraulic transmission between the drive and the slide.

5. In a press, a slide, a reciprocating drive for the slide having harmonic motion, and a hydraulic transmission between the drive and the slide including a fixed cylinder a reciprocating cylinder having a piston in the fixed cylinder, and a piston in said reciprocating cylinder, a tank n communication with said cylinders, valve means for the communication, and control means to actuate said valve means to vent the fixed cylinder below the piston therein to the tank and charge the reciprocating cylinder below the piston therein for an approach stroke and to vent the reciprocating cylinder below the piston therein to the tank and connect the reciprocating cylinder above the piston therein to the fixed cylinder below the piston therein for a return stroke.

6. In a press, a slide, a mechanical drive for the slide having harmonic motion, and a hydraulic transmission and pullback between the drive and the slide, including a piston movable with the drive, a combination piston and cylinder member movable with the slide and telescopically receiving the piston, and a relatively fixed cylinder telescopically receiving said member, and means for filling and venting the transmission and pullback under controlled conditions during the press cycle.

7. A press as called for in claim 6, in which said piston acts hydraulically on said member during a portion of the drive movement to move the slide for a draw stroke and on another portion of the drive movement to move the slide for a draw stroke and on another portion of the drive movement to move the slide on a strip and return stroke.

8. A press as called for in claim 6, in which said member and slide drop through a quick approach under the force of gravity, and said piston acts hydraulically on said member during a portion of the drive movement to move said slide for a draw stroke and on another portion of the drive movement to move said slide for a strip and return stroke.

9. A press as called for in claim 6, in which said member and slide drop through a quick approach under the force of gravity, said piston acting hydraulically on said member during a first portion of the drive movement to move said slide for a draw stroke and on another portion of the drive movement to move said slide for a strip and return stroke, said slide being constructed and arranged to reach its bottom position prior to the termination of the first portion of the drive movement, and said filling and venting means being adapted to permit fluid to escape from between said piston and said member when a predetermined dwell pressure is reached.

10. A press as called for in claim 6, in which said filling and venting means includes a pullback valve arranged to permit fluid to discharge from between said member and said relatively fixed cylinder to enable said slide and said member to drop through a quick approach and a prefill valve arranged to open in response to a suction created between said piston and said member when said member and slide drop through the quick approach thereby permitting the flow of fluid into the space between said member and piston.

11. A press as called for in claim 6, in which said filling and venting means includes a pull-back valve arranged to permit fluid to discharge from between said member and said relatively fixed cylinder to enable said slide and said member to drop through a quick approach, a prefill valve constructed and arranged to open in response to a suction created between said piston and said member when said member and slide drop through the quick approach thereby permitting the flow of fluid into the space between said member and piston, a pullback valve closing actuator means mounted on said slide and adapted to close said pullback valve to terminate fluid flow from between said member and said relatively fixed cylinder thereby to end said quick approach, and a holding valve paralleling said pullback valve and spring loaded to normally support the weight of said member and said slide, said holding valve acting as a relief valve to cushion the blow on said member and slide when said pullback valve closes.

12. A press as called for in claim 6, in which said filling and venting means is constructed and arranged to cause said drive and member to drop through a quick approach stroke, means to start said drive when said slide reaches the end of its approach stroke, said filling and venting means also including a spring loaded pressure relief valve in the hydraulic connection between said member and piston, whereby when said piston applies force to said member through the fluid therebetween, the force is limited by the spring loading on said pressure relief valve.

13. A press as called for in claim 6, in which said filling and venting means includes a first check valve adapted to open and permit the passage of fluid into a first chamber above said piston in response to a suction created in the first chamber when said drive moves said piston downwardly for a draw stroke, a second check valve adapted to open and permit flow of fluid from said first chamber to a pullback chamber in response to an increase in pressure in said first chamber when said drive moves said piston upwardly for a return stroke, said flow of fluid into said pullback chamber causing said member and slide to be raised, and valve means operated by fluid pressure in said pullback chamber and adapted to vent a third chamber between the lower side of said piston and said member to permit the flow of fluid therefrom.

14. In a press as called for in claim 6, a control system comprising a starting switch which initiates a drop of said slide and member through an approach stroke, a second switch operated by a cam on said slide and connected to terminate said approach stroke and start the operation of said drive when said slide reaches a predetermined position, a third switch operated by said drive when in its most extended position and connected to prepare said filling and venting means for a return stroke of the slide, and a fourth switch operated by said drive when said drive has completed one revolution to terminate operation of the drive.

ALOIS KARL NOWAK.

REFERENCES CITED

The following references are of record in the file of this patent:

UNITED STATES PATENTS

| Number | Name | Date |
|---|---|---|
| 631,789 | Greenwood | Aug. 29, 1899 |
| 1,094,092 | Oyster | Apr. 21, 1914 |
| 1,956,989 | Lapointe | May 1, 1934 |
| 2,324,149 | Gray | July 13, 1943 |
| 2,357,632 | Cornelius | Sept. 5, 1944 |
| 2,526,388 | Miller | Oct. 17, 1950 |

FOREIGN PATENTS

| Number | Country | Date |
|---|---|---|
| 60,958 | Germany | Feb. 13, 1892 |
| 100,646 | Germany | Jan. 5, 1899 |
| 430,756 | Germany | June 23, 1926 |
| 371,328 | France | Jan. 19, 1907 |
| 606,576 | France | Mar. 12, 1926 |